(12) United States Patent
Glew et al.

(10) Patent No.: US 7,308,576 B2
(45) Date of Patent: Dec. 11, 2007

(54) AUTHENTICATED CODE MODULE

(75) Inventors: Andrew F. Glew, Madison, WA (US); James A. Sutton, Portland, OR (US); Lawrence O. Smith, Beaverton, OR (US); David W. Grawrock, Aloha, OR (US); Gilbert Neiger, Portland, OR (US); Michael A. Kozuch, Export, PA (US)

(73) Assignee: Intel Corporation, Santa Clara, CA (US)

( * ) Notice: Subject to any disclaimer, the term of this patent is extended or adjusted under 35 U.S.C. 154(b) by 777 days.

(21) Appl. No.: 10/039,595

(22) Filed: Dec. 31, 2001

(65) Prior Publication Data

US 2003/0126442 A1  Jul. 3, 2003

(51) Int. Cl.
| H04L 9/00 | (2006.01) |
| G06F 11/30 | (2006.01) |
| G06F 15/16 | (2006.01) |
| H04L 29/06 | (2006.01) |
| G06G 1/00 | (2006.01) |
| G06G 12/14 | (2006.01) |

(52) U.S. Cl. .................. 713/170; 713/194; 709/229

(58) Field of Classification Search ............... 713/170, 713/171, 172, 173, 174, 185, 186, 168, 182, 713/194, 176, 181; 709/225, 229; 726/32
See application file for complete search history.

(56) References Cited

U.S. PATENT DOCUMENTS

| 3,996,449 A | 12/1976 | Attanasio et al. |
| 4,037,214 A | 7/1977 | Birney et al. |
| 4,162,536 A | 7/1979 | Morley |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,323 A | 3/1982 | Ermolovich et al. |
| 4,347,565 A | 8/1982 | Kaneda et al. |
| 4,366,537 A | 12/1982 | Heller et al. |
| 4,430,709 A | 2/1984 | Schleupen |
| 4,521,852 A | 6/1985 | Guttag |
| 4,529,870 A | 7/1985 | Chaum |
| 4,571,672 A | 2/1986 | Hatada et al. |

(Continued)

FOREIGN PATENT DOCUMENTS

| DE | 4217444 | 12/1992 |

(Continued)

OTHER PUBLICATIONS

T. Wenisch et al., "Store-Ordered Streaming of Shared Memory", Proceedings of the 14th International Conference on Parallel Architectures and Compilation Techniques, Sep. 2005, pp. 75-84.*

(Continued)

Primary Examiner—Matthew Smithers
Assistant Examiner—Courtney D. Fields
(74) Attorney, Agent, or Firm—Blakely, Sokoloff, Taylor & Zafman LLP

(57) ABSTRACT

An authenticated code module comprises a value that attests to the authenticity of the module. The value is encrypted with a key corresponding to a key of a computing device that is to execute the module.

20 Claims, 12 Drawing Sheets

U.S. PATENT DOCUMENTS

| | | |
|---|---|---|
| 4,621,318 A | 11/1986 | Maeda |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,843,541 A | 6/1989 | Bean et al. |
| 4,907,270 A | 3/1990 | Hazard |
| 4,907,272 A | 3/1990 | Hazard |
| 4,910,774 A | 3/1990 | Barakat |
| 4,974,159 A | 11/1990 | Hargrove et al. |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,230,069 A | 7/1993 | Brelsford et al. |
| 5,255,379 A | 10/1993 | Melo |
| 5,293,424 A | 3/1994 | Hotley et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,488,716 A | 1/1996 | Schneider et al. |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,606,617 A | 2/1997 | Brands |
| 5,615,263 A | 3/1997 | Takahashi |
| 5,628,022 A | 5/1997 | Ueno et al. |
| 5,628,023 A | 5/1997 | Bryant et al. |
| 5,657,445 A | 8/1997 | Pearce |
| 5,680,547 A | 10/1997 | Chang |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,757,919 A | 5/1998 | Herbert et al. |
| 5,764,969 A | 6/1998 | Kahle et al. |
| 5,796,835 A | 8/1998 | Saada |
| 5,796,845 A | 8/1998 | Serikawa et al. |
| 5,805,712 A | 9/1998 | Davis |
| 5,815,665 A | 9/1998 | Teper et al. |
| 5,825,875 A | 10/1998 | Ugon |
| 5,832,089 A | 11/1998 | Kravitz et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,844 A | 2/1999 | Yacobi |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,901,229 A | 5/1999 | Fujisaki et al. |
| 5,903,752 A | 5/1999 | Dingwall et al. |
| 5,937,063 A | 8/1999 | Davis |
| 5,944,821 A | 8/1999 | Angelo |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,131 A | 11/1999 | Clapp |
| 5,987,557 A | 11/1999 | Ebrahim |
| 6,014,745 A | 1/2000 | Ashe |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,101,584 A | 8/2000 | Satou et al. |
| 6,115,816 A | 9/2000 | Davis |
| 6,125,430 A | 9/2000 | Noel et al. |
| 6,138,239 A | 10/2000 | Veil |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakaumra |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery et al. |
| 6,314,409 B2 | 11/2001 | Schneck et al. |
| 6,321,314 B1 | 11/2001 | Van Dyke |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,401,208 B2 * | 6/2002 | Davis et al. ............... 713/193 |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |

| | | | |
|---|---|---|---|
| 6,463,535 B1 | 10/2002 | Drews et al. | |
| 6,463,537 B1 | 10/2002 | Tello | |
| 6,473,508 B1 | 10/2002 | Young et al. | |
| 6,473,800 B1 | 10/2002 | Jerger et al. | |
| 6,496,847 B1 | 12/2002 | Bugnion et al. | |
| 6,499,123 B1 | 12/2002 | McFarland et al. | |
| 6,505,279 B1 | 1/2003 | Phillips et al. | |
| 6,507,904 B1 | 1/2003 | Ellison et al. | |
| 6,535,988 B1 | 3/2003 | Poisner | |
| 6,557,104 B2 | 4/2003 | Vu et al. | |
| 6,633,963 B1 | 10/2003 | Ellison et al. | |
| 6,633,981 B1 | 10/2003 | Davis | |
| 6,871,276 B1 | 3/2005 | Simon | |
| 6,944,699 B1 | 9/2005 | Bugnion et al. | |
| 6,988,250 B1 | 1/2006 | Proudler et al. | |
| 7,017,043 B1 * | 3/2006 | Potkonjak | 713/176 |
| 7,028,149 B2 | 4/2006 | Grawrock et al. | |
| 7,133,990 B2 | 11/2006 | Link et al. | |
| 7,165,181 B2 | 1/2007 | Brickell | |
| 2001/0021969 A1 | 9/2001 | Burger et al. | |
| 2001/0027527 A1 | 10/2001 | Khidekel et al. | |
| 2001/0037450 A1 | 11/2001 | Metlitski et al. | |
| 2002/0004900 A1 | 1/2002 | Patel | |
| 2002/0150252 A1 * | 10/2002 | Wong | 380/277 |
| 2002/0154782 A1 | 10/2002 | Chow et al. | |
| 2003/0002668 A1 | 1/2003 | Graunke et al. | |
| 2003/0018892 A1 | 1/2003 | Tello | |
| 2003/0112008 A1 | 6/2003 | Hennig | |
| 2003/0188156 A1 | 10/2003 | Yasala et al. | |
| 2003/0231328 A1 | 12/2003 | Chapin et al. | |
| 2003/0235175 A1 | 12/2003 | Naghiam et al. | |
| 2004/0103281 A1 | 5/2004 | Brickell | |
| 2005/0039180 A1 | 2/2005 | Fultheim et al. | |

FOREIGN PATENT DOCUMENTS

| | | | |
|---|---|---|---|
| EP | 0473913 | | 3/1992 |
| EP | 0602867 | | 6/1994 |
| EP | 0600112 | | 8/1994 |
| EP | 0892521 | | 1/1999 |
| EP | 0930567 A | | 7/1999 |
| EP | 0961193 | | 12/1999 |
| EP | 0965902 | | 12/1999 |
| EP | 1 030 237 A | | 8/2000 |
| EP | 1055989 | | 11/2000 |
| EP | 1056014 | | 11/2000 |
| EP | 1085396 | | 3/2001 |
| EP | 1146715 | | 10/2001 |
| EP | 1209563 | | 5/2002 |
| EP | 1271277 | | 1/2003 |
| FR | 2 620 248 | | 3/1989 |
| FR | 2 700 430 | | 7/1994 |
| FR | 2 714 780 | | 7/1995 |
| FR | 2 742 618 | | 6/1997 |
| FR | 2 752 122 | | 2/1998 |
| FR | 2 763 452 | | 11/1998 |
| FR | 2 830 147 | | 3/2003 |
| JP | 02000076139 A | | 3/2000 |
| JP | 2006094114 A | * | 4/2006 |
| WO | WO9524696 | | 9/1995 |
| WO | WO 97/29567 | | 8/1997 |
| WO | WO9812620 | | 3/1998 |
| WO | WO9834365 A | | 8/1998 |
| WO | WO9844402 | | 10/1998 |
| WO | WO99/09482 | | 2/1999 |
| WO | WO9905600 | | 2/1999 |
| WO | WO9918511 | | 4/1999 |
| WO | WO9957863 | | 11/1999 |
| WO | WO99/65579 | | 12/1999 |
| WO | WO0021238 | | 4/2000 |
| WO | WO0062232 | | 10/2000 |
| WO | WO 01/27723 A | | 4/2001 |
| WO | WO 01/27821 A | | 4/2001 |
| WO | WO0163994 | | 8/2001 |
| WO | WO 01 75564 A | | 10/2001 |
| WO | WO 01/75565 | | 10/2001 |
| WO | WO 01/75595 | | 10/2001 |
| WO | WO0201794 | | 1/2002 |
| WO | WO 02 17555 A | | 2/2002 |
| WO | WO02060121 | | 8/2002 |
| WO | WO 02 086684 A | | 10/2002 |
| WO | WO03058412 | | 7/2003 |

OTHER PUBLICATIONS

Heinrich, J., "MIPS R4000 Microprocessor User's Manual,"Apr. 1, 1993, MIPS, MT. View, XP002184449, pp. 61-97.

"M68040 User's Manual," 1993, Motorola, Inc., pp. 1-20.

"Intel 386 DX Microprocessor 32-BIT CHMOS Microprocessor with Integrated Memory Management," Dec. 31, 1995, Intel, Inc., pp. 32-56; figures 4-14.

Berg, C., "How Do I Create a Signed Applet?," Dr. Dobb's Journal, M&T Publ., Redwood City, CA, US, vol. 22, No. 8, Aug. 1997, pp. 109-111, 122.

Gong, L., et al., "Going Beyond the Sandbox: An Overview of the New Security Architecture in the Java Development Kit 1.2," Proceedings of the Usenix Symposium on the Internet Technologies and Systems, Monterrey, CA Dec. 1997, pp. 103-112.

Goldberg, R., "Survey of virtual machine research," IEEE Computer Magazine 7(6), pp. 34-45, 1974.

Gum, P.H., "System/370 Extended Architecture: Facilities for Virtual Machines," IBM J. Research Development, Vol. 27, No. 6, pp. 530-544, Nov. 1983.

Rosenblum, M. "Vmware's Virtual Platform: A Virtual Machine Monitor for Commodity PCs," Proceedings of the 11th Hotchips Conference, pp. 185-196, Aug. 1999.

Lawton, K., "Running Mulitple Operating Systems Concurrently on an IA32 PC Using Virtualization Techniques," http://www.plex86.org/research/paper.txt; Aug. 9, 2001; pp. 1-31.

"Trust Computing Platform Alliance (TCPA)," Main Specification Version 1.1a, Compaq Computer Corporation, Hewlett-Packard Company, IBM Corporation, Intel Corporation, Microsoft Corporation, Dec. 2001.

Heinrich, J., "MIPS R4000 Microprocessor User's Manual," 1994, MIPS Technology, Inc., Mountain View, CA, pp. 67-79.

Heinrich, J. "MIPS R4000 Microprocessor User's Manual," Apr. 1, 1993, MIPS, Mt. View, XP002184449, pp. 61-97.

"Information Display Technique for a Terminate Stay Resident Program," IBM Technical Disclosure Bulletin, TDB-ACC-No. NA9112156, Dec. 1, 1991, pp. 156-158, vol. 34, Issue No. 7A.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1-17, XP002247347, Denver, CO.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

Brands, Stefan, "Restrictive Blinding of Secret-Key Certificates", *Springer-Verlag XP002201306*, (1995),Chapter 3.

Davida, George I., et al., "Defending Systems Against Viruses through Cryptographic Authentication", *Proceedings of the Symposium on Security and Privacy,* IEEE Comp. Soc. Press, ISBN 0-8186-1939-2,(May 1989).

Kashiwagi, Kazuhiko , et al., "Design and Implementation of Dynamically Reconstructing System Software", *Software Engineering Conference,* Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn , et al., "Replacement Strategy for Aging Avionics Computers", *IEEE AES Systems Magazine,* XP002190614,(Mar. 1999).

Menezes, Oorschot , "Handbook of Applied Cryptography", *CRC Press LLC, USA XP002201307,* (1997),475.

Richt, Stefan , et al., "In-Circuit-Emulator Wird Echtzeittauglich", *Elektronic, Franzis Verlag GMBH, Munchen, DE,* vol. 40, No. 16, XP000259620,(100-103),8-6-1991.

Saez, Sergio , et al., "A Hardware Scheduler for Complex Real-Time Systems", *Proceedings of the IEEE International Symposium on Industrial Electronics,* XP002190615,(Jul. 1999),43-48.

Sherwood, Timothy , et al., "Patchable Instruction ROM Architecture", *Department of Computer Science and Engineering, University of California, San Diego, La Jolla, CA,* (Nov. 2001).

Coulouris, George , et al., "Distributed Systems, Concepts and Designs", *2nd Edition,* (1994),422-424.

Crawford, John , "Architecture of the Intel 80386", *Proceedings of the IEEE International Conference on Computer Design: VLSI in Computers and Processors (ICCD '86),* (Oct. 6, 1986), 155-160.

Fabry, R.S. , "Capability-Based Addressing", *Fabry, R.S., "Capability-Based Addressing," Communications of the ACM,* vol. 17, No. 7, (Jul. 1974),403-412.

Frieder, Gideon , "Architecture And Operational Characteristics of the VMX Host Machine", *The Architecture And Operational Characteristics of the VMX Host Machine, IEEE,* (1982),9-16.

Intel Corporation, "Intel 82802AB/82802AC *Firmware Hub* (FWH)", *Intel Product Datasheet,* Document No. 290658-004,(Nov. 2000),1-6, 17-28.

Intel Corporation, "Intel IA-64 Architecture Software Developer's Manual", *vol. 2: IA-64 System Architecture, Order No. 245318-001,* (Jan. 2000),i, ii, 5.1-5.3, 11.1-11.8, 11.23-11.26.

Menezes, Alfred J., et al., "Handbook of Applied Cryptography", *CRC Press Series on Discrete Mathematics and its Applications,* Boca Raton, FL, XP002165287, ISBN 0849385237,(Oct. 1996),403-405, 506-515, 570.

Nanba, S. , et al., "VM/4: ACOS-4 Virtual Machine Architecture", *VM/4: ACOS-4 Virtual Machine Architecture, IEEE,* (1985), 171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce , "Applied Cryptography: Protocols, Algorithm, and Source Code in C", *Wiley, John & Sons, Inc.,* XP002939871; ISBN 0471117099,(Oct. 1995),47-52.

Schneier, Bruce , "Applied Cryptography: Protocols, Algorithm, and Source Code in C", *Wiley, John & Sons, Inc.,* XP002138607; ISBN 0471117099,(Oct. 1995),56-65.

Schneier, Bruce , "Applied Cryptography: Protocols, Algorithms, and Source Code C", *Wiley, John & Sons, Inc.,* XP0021111449; ISBN 0471117099,(Oct. 1995), 169-187.

Schneier, Bruce , "Applied Cryptography: Protocols, Algorithms, and Source Code in C", *2nd Edition: Wiley, John & Sons, Inc.,* XP002251738; ISBN 0471128457,(Nov. 1995),28-33; 176-177; 216-217; 461-473; 518-522.

Office Action for U.S. Appl. No. 10/185,123, dated Apr. 16, 2007, 10 pages.

Office Action for U.S. Appl. No. 10/663,206, dated Apr. 19, 2007.

Office Action for U.S. Appl. No. 10/814,569, dated Apr. 5, 2007, 5 pages.

PCT Search Report for PCT/US2005/010156, dated Aug. 22, 2006, 6 pages.

Ateniese, Giuseppe , et al., "A Practical and Provably Secure Coalition-Resistant Group Signature Scheme", *Advances in Cryptology—CRYPTO2000, vol. 1880 of Lecture Notes in Computer Science,* Int'; Assoc for Crypt Res, Spring-Verlag, Berlin, Germany,(2000),255-270.

Hall, Judith S., et al., "Virtualizing the VAX Architecture", *ACM SIGARCH Computer Architecture News, Proceedings of the 18th Annual International Symposium on Computer Architecture,* vol. 19, Issue No. 3, (Apr. 1991), 10 pages.

Rosenberg, Jonathan B., "How Debuggers Work (Algorithms, Data Structures, and Architecture", *Chapters 3 and 5 Hardware Debugger Facilities, Wiley Computer Publishing, United States,* (1996),pp. 42-43, 95, 96 and 99.

Chaum, Security Without Identification: Transaction Systems to Make Big Brother Obsolete, Comm of the ACM vol. 28, No. 10, p. 1030-1044, 1985.

* cited by examiner

AUTHENTICATED CODE MODULE

RELATED APPLICATIONS

This application is related to application Ser. No. 10/039,961, entitled "Processor Supporting Execution Of An Authenticated Code Instruction"; and application Ser. No. 10/041,071, entitled "Authenticated Code Method And Apparatus" both filed on the same date as the present application.

BACKGROUND

Computing devices execute firmware and/or software code to perform various operations. The code may be in the form of user applications, BIOS routines, operating system routines, etc. Some operating systems provide limited protections for maintaining the integrity of the computing device against rogue code. For example, an administrator may limit users or groups of users to executing certain pre-approved code. Further, an administrator may configure a sandbox or an isolated environment in which untrusted code may be executed until the administrator deems the code trustworthy. While the above techniques provide some protection, they generally require an administrator to manually make a trust determination based upon the provider of the code, historic performance of the code, and/or review of the source code itself.

Other mechanisms have also been introduced to provide automated mechanisms for making a trust decision. For example, an entity (e.g. software manufacturer) may provide the code with a certificate such as a X.509 certificate that digitally signs the code and attests to the integrity of the code. An administrator may configure an operating system to automatically allow users to execute code that provides a certificate from a trusted entity without the administrator specifically analyzing the code in question. While the above technique may be sufficient for some environments, the above technique inherently trusts the operating system or other software executing under the control of the operating system to correctly process the certificate.

Certain operations, however, may not be able to trust the operating system to make such a determination. For example, the code to be executed may result in the computing device determining whether the operating system is to be trusted. Relying on the operating system to authenticate such code would thwart the purpose of the code. Further, the code to be executed may comprise system initialization code that is executed prior to the operating system of the computing device. Such code therefore cannot be authenticated by the operating system.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements.

DETAILED DESCRIPTION

Figure 1A:
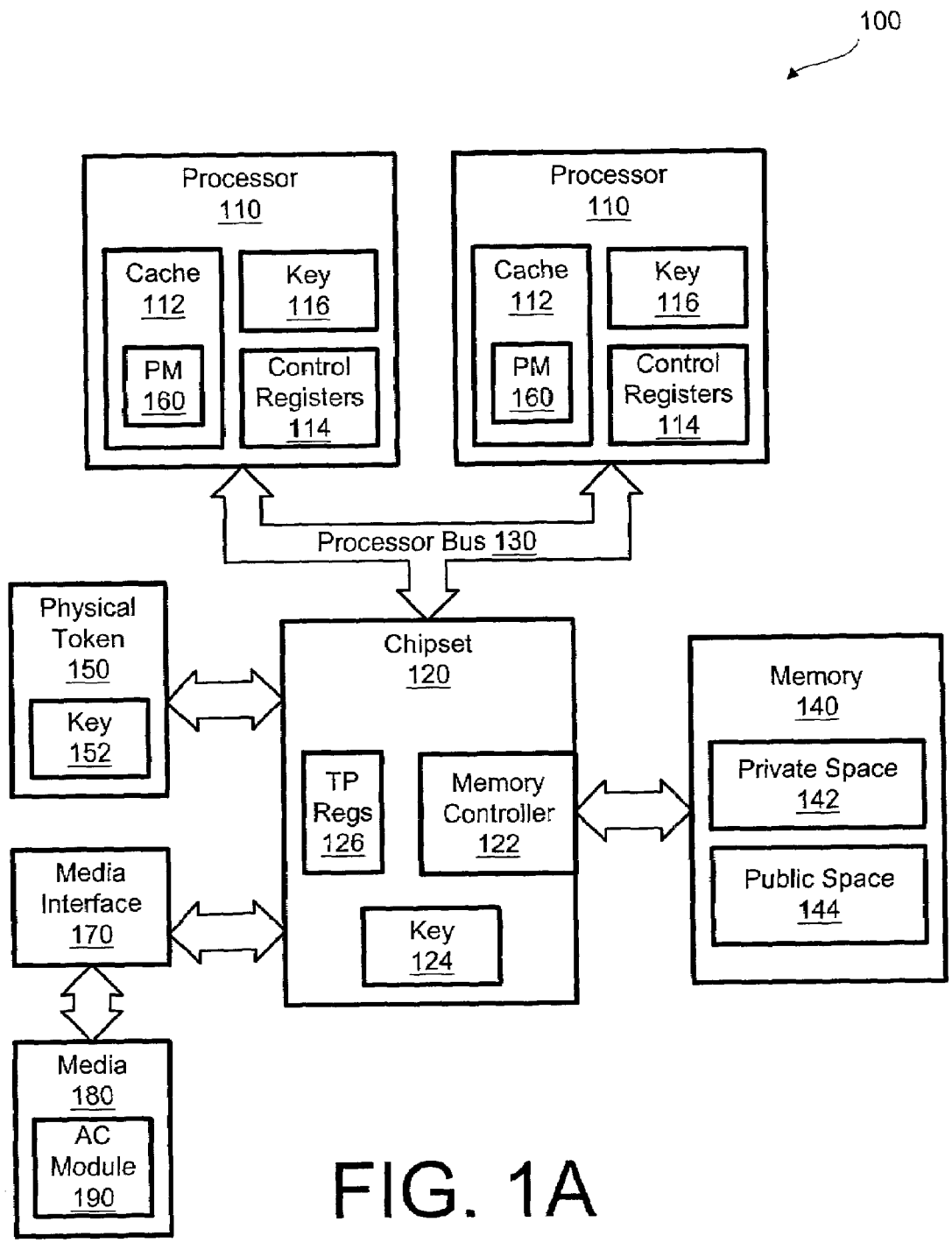
FIGS. 1A-1E illustrate example embodiments of a computing device having private memory.

The following description describes techniques for launching and terminating execution of authenticated code (AC) modules that may be used for various operations such as establishing and/or maintaining a trusted computing environment. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Example embodiments of a computing device 100 are shown in FIGS. 1A-1E. The computing device 100 may comprise one or more processors 110 coupled to a chipset 120 via a processor bus 130. The chipset 120 may comprise one or more integrated circuit packages or chips that couple the processors 110 to system memory 140, a physical token 150, private memory 160, a media interface 170, and/or other I/O devices of the computing device 100.

Each processor 110 may be implemented as a single integrated circuit, multiple integrated circuits, or hardware with software routines (e.g., binary translation routines). Further, the processors 110 may comprise cache memories 112 and control registers 114 via which the cache memories 112 may be configured to operate in a normal cache mode or in a cache-as-RAM mode. In the normal cache mode, the cache memories 112 satisfy memory requests in response to cache hits, replace cache lines in response to cache misses, and may invalidate or replace cache lines in response to snoop requests of the processor bus 130. In the cache-as-RAM mode, the cache memories 112 operate as random access memory in which requests within the memory range of the cache memories 112 are satisfied by the cache memories and lines of the cache are not replaced or invalidated in response to snoop requests of the processor bus 130.

The processors 110 may further comprise a key 116 such as, for example, a key of a symmetric cryptographic algorithm (e.g. the well known DES, 3DES, and AES algorithms) or of an asymmetric cryptographic algorithm (e.g. the well-known RSA algorithm). The processor 110 may use the key 116 to authentic an AC module 190 prior to executing the AC module 190.

The processors 110 may support one or more operating modes such as, for example, a real mode, a protected mode, a virtual real mode, and a virtual machine mode (VMX mode). Further, the processors 110 may support one or more privilege levels or rings in each of the supported operating modes. In general, the operating modes and privilege levels of a processor 110 define the instructions available for execution and the effect of executing such instructions. More specifically, a processor 110 may be permitted to execute certain privileged instructions only if the processor 110 is in an appropriate mode and/or privilege level.

The processors 110 may also support locking of the processor bus 130. As a result of locking the processor bus 130, a processor 110 obtains exclusive ownership of the processor bus 130. The other processors 110 and the chipset 120 may not obtain ownership of the processor bus 130 until the processor bus 130 is released. In an example embodiment, a processor 110 may issue a special transaction on the processor bus 130 that provides the other processors 110 and the chipset 120 with a LT.PROCESSOR.HOLD message. The LT.PROCESSOR.HOLD bus message prevents the other processors 110 and the chipset 120 from acquiring ownership of the processor bus 130 until the processor 110 releases the processor bus 130 via a LT.PROCESSOR.RELEASE bus message.

The processors 110 may however support alternative and/or additional methods of locking the processor bus 130. For example, a processor 110 may inform the other processors 110 and/or the chipset 120 of the lock condition by issuing an Inter-Processor Interrupt, asserting a processor bus lock signal, asserting a processor bus request signal, and/or causing the other processors 110 to halt execution. Similarly, the processor 110 may release the processor bus 130 by issuing an Inter-Processor Interrupt, deasserting a processor bus lock signal, deasserting a processor bus request signal, and/or causing the other processors 110 to resume execution.

The processors 110 may further support launching AC modules 190 and terminating execution of AC modules 190. In an example embodiment, the processors 110 support execution of an ENTERAC instruction that loads, authenticates, and initiates execution of an AC module 190 from private memory 160. However, the processors 110 may support additional or different instructions that cause the processors 110 to load, authenticate, and/or initiate execution of an AC module 190. These other instructions may be variants for launching AC modules 190 or may be concerned with other operations that launch AC modules 190 to help accomplish a larger task. Unless denoted otherwise, the ENTERAC instruction and these other instructions are referred to hereafter as launch AC instructions despite the fact that some of these instructions may load, authenticate, and launch an AC module 190 as a side effect of another operation such as, for example, establishing a trusted computing environment.

Figure 6:
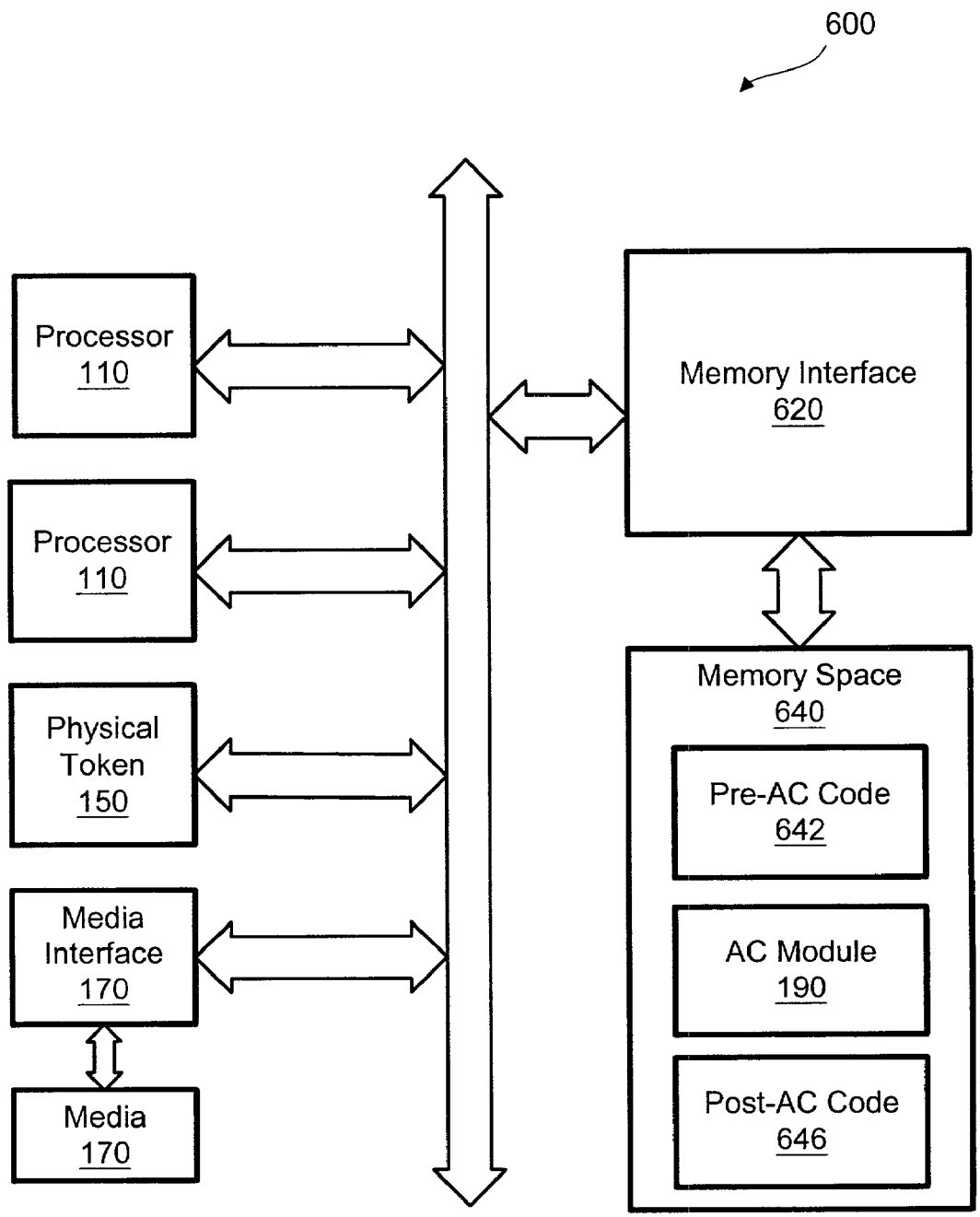
FIG. 6 illustrates another embodiment of the computing device shown in FIGS. 1A-1E.

In an example embodiment, the processors 110 further support execution of an EXITAC instruction that terminates execution of an AC module 190 and initiates post-AC code (See, FIG. 6). However, the processors 110 may support additional or different instructions that result in the processors 110 terminating an AC module 190 and launching post-AC code. These other instructions may be variants of the EXITAC instruction for terminating AC modules 190 or may be instructions concerned primarily with other operations that result in AC modules 190 being terminated as part of a larger operation. Unless denoted otherwise, the EXITAC instruction and these other instructions are referred to hereafter as terminate AC instructions despite the fact that some of these instructions may terminate AC modules 190 and launch post-AC code as a side effect of another operation such as, for example, tearing down a trusted computing environment.

The chipset 120 may comprise a memory controller 122 for controlling access to the memory 140. Further, the chipset 120 may comprise a key 124 that the processor 110 may use to authentic an AC module 190 prior to execution. Similar to the key 116 of the processor 110, the key 124 may comprise a key of a symmetric or asymmetric cryptographic algorithm.

The chipset 120 may also comprise trusted platform registers 126 to control and provide status information about trusted platform features of the chipset 120. In an example embodiment, the chipset 120 maps the trusted platform registers 126 to a private space 142 and/or a public space 144 of the memory 140 to enable the processors 110 to access the trusted platform registers 126 in a consistent manner.

For example, the chipset 120 may map a subset of the registers 126 as read only locations in the public space 144 and may map the registers 126 as read/write locations in the private space 142. The chipset 120 may configure the private space 142 in a manner that enables only processors 110 in the most privileged mode to access its mapped registers 126 with privileged read and write transactions. Further, the chipset 120 may further configure the public space 144 in a manner that enables processors 110 in all privilege modes to access its mapped registers 126 with normal read and write transactions. The chipset 120 may also open the private space 142 in response to an OpenPrivate command being written to a command register 126. As a result of opening the private space 142, the processors 110 may access the private space 142 in the same manner as the public space 144 with normal unprivileged read and write transactions.

The physical token 150 of the computing device 100 comprises protected storage for recording integrity metrics and storing secrets such as, for example, encryption keys. The physical token 150 may perform various integrity functions in response to requests from the processors 110 and the chipset 120. In particular, the physical token 150 may store integrity metrics in a trusted manner, may quote integrity metrics in a trusted manner, may seal secrets such as encryption keys to a particular environment, and may only unseal secrets to the environment to which they were sealed. Hereinafter, the term "platform key" is used to refer to a key that is sealed to a particular hardware and/or software environment. The physical token 150 may be implemented in a number of different manners. However, in an example embodiment, the physical token 150 is implemented to comply with the specification of the Trusted Platform Module (TPM) described in detail in the Trusted Computing Platform Alliance (TCPA) Main Specification, Version 1.1, 31 Jul. 2001.

Figure 1B:
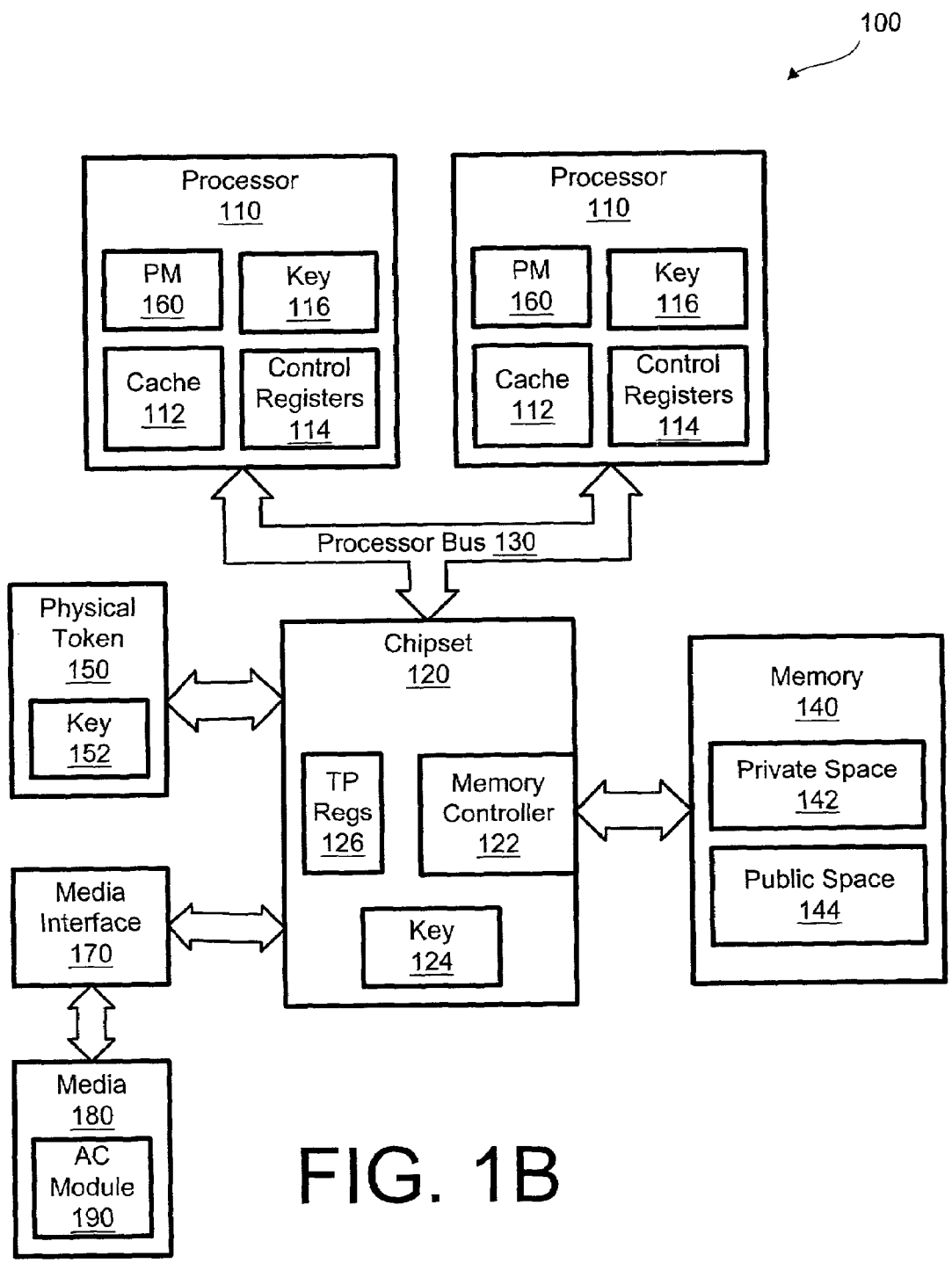
Figure 1C:
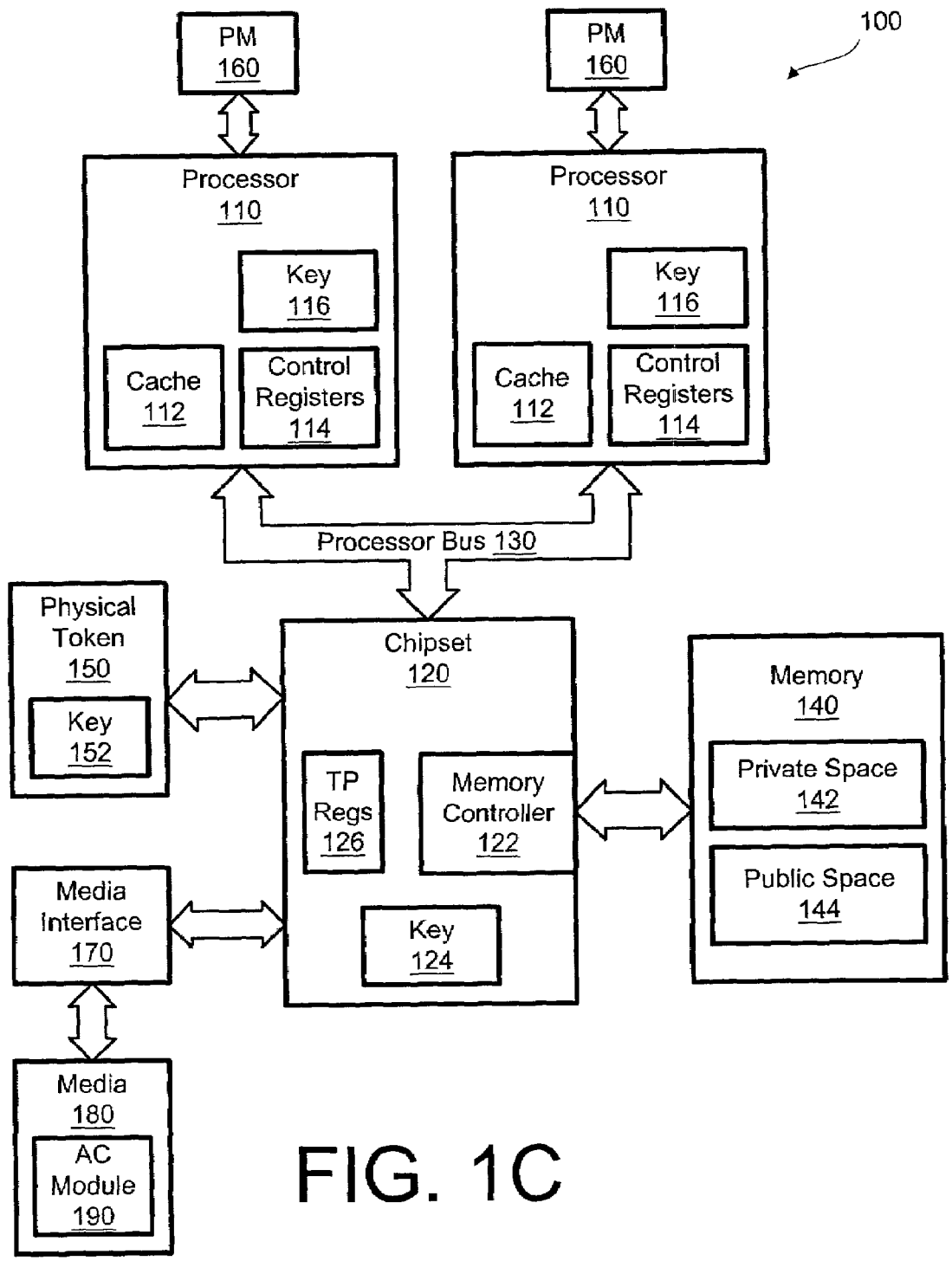
Figure 1D:
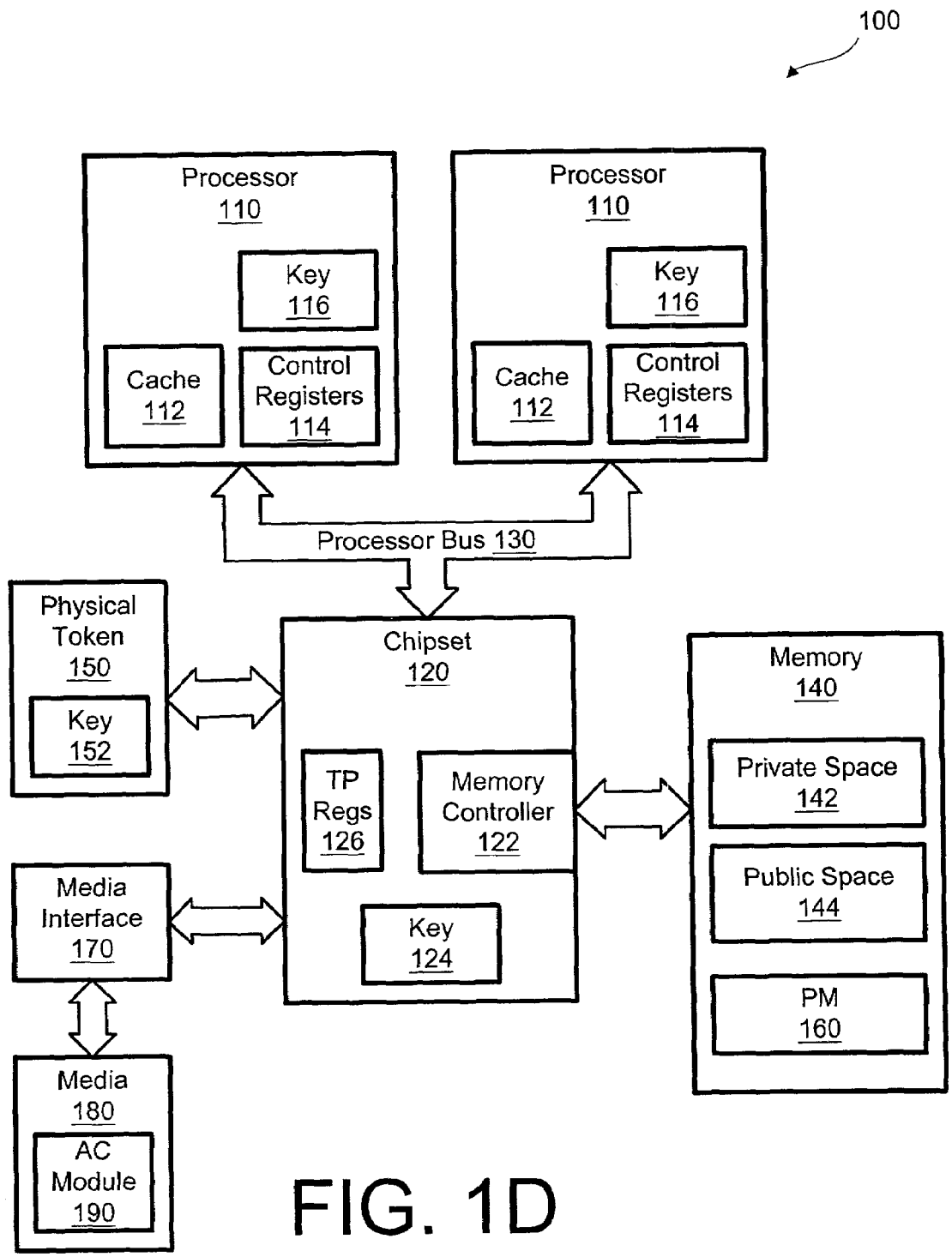

The private memory 160 may store an AC module 190 in a manner that allows the processor or processors 110 that are to execute the AC module 190 to access the AC module 190 and that prevents other processors 110 and components of the computing device 100 from altering the AC module 190 or interfering with the execution of the AC module 190. As shown in FIG. 1A, the private memory 160 may be implemented with the cache memory 112 of the processor 110 that is executing the launch AC instruction. Alternatively, the private memory 160 may be implemented as a memory area internal to the processor 110 that is separate from its cache memory 112 as shown in FIG. 1B. The private memory 160 may also be implemented as a separate external memory coupled to the processors 110 via a separate dedicated bus as shown in FIG. 1C, thus enabling only the processors 110 having associated external memories to validly execute launch AC instructions.

The private memory 160 may also be implemented via the system memory 140. In such an embodiment, the chipset 120 and/or processors 110 may define certain regions of the memory 140 as private memory 160 (see FIG. 1D) that may be restricted to a specific processor 110 and that may only be accessed by the specific processor 110 when in a particular operating mode. One disadvantage of this implementation is that the processor 110 relies on the memory controller 122 of the chipset 120 to access the private memory 160 and the AC module 190. Accordingly, an AC module 190 may not be able to reconfigure the memory controller 122 without denying the processor 110 access to the AC module 190 and thus causing the processor 110 to abort execution of the AC module 190.

Figure 1E:
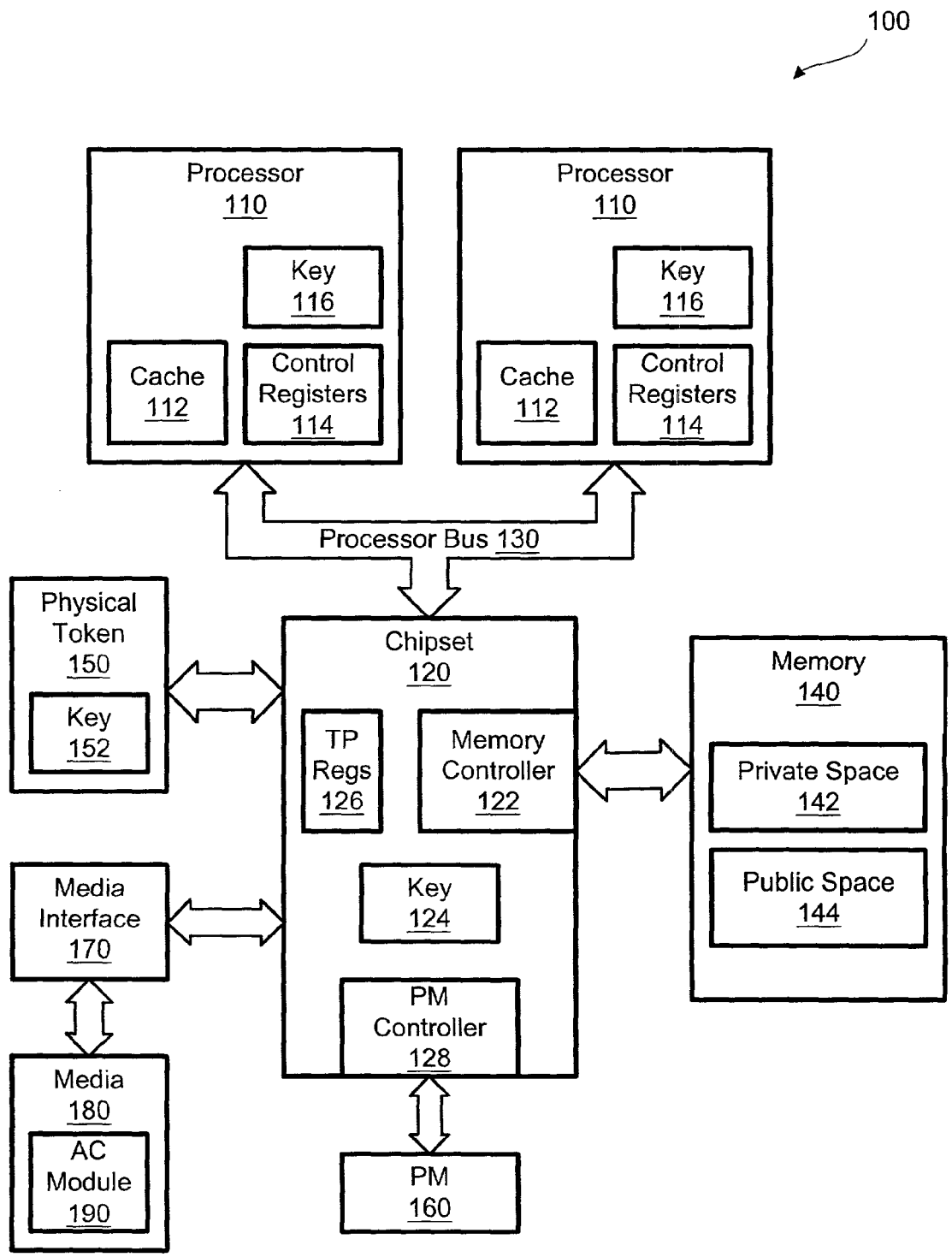

The private memory 160 may also be implemented as a separate memory coupled to a separate private memory controller 128 of the chipset 120 as shown in FIG. 1E. In such an embodiment, the private memory controller 128 may provide a separate interface to the private memory 160. As a result of a separate private memory controller 128, the processor 110 may be able to reconfigure the memory controller 122 for the system memory 140 in a manner that ensures that the processor 110 will be able to access the private memory 160 and the AC module 190. In general, the separate private memory controller 128 overcomes some disadvantages of the embodiment shown in FIG. 1D at the expense of an additional memory and memory controller.

The AC module 190 may be provided in any of a variety of machine readable mediums 180. The media interface 170 provides an interface to a machine readable medium 180 and AC module 190. The machine readable medium 180 may comprise any medium that can store, at least temporarily, information for reading by the machine interface 170. This may include physical storage media such as various types of disk and memory storage devices.

Figure 2:
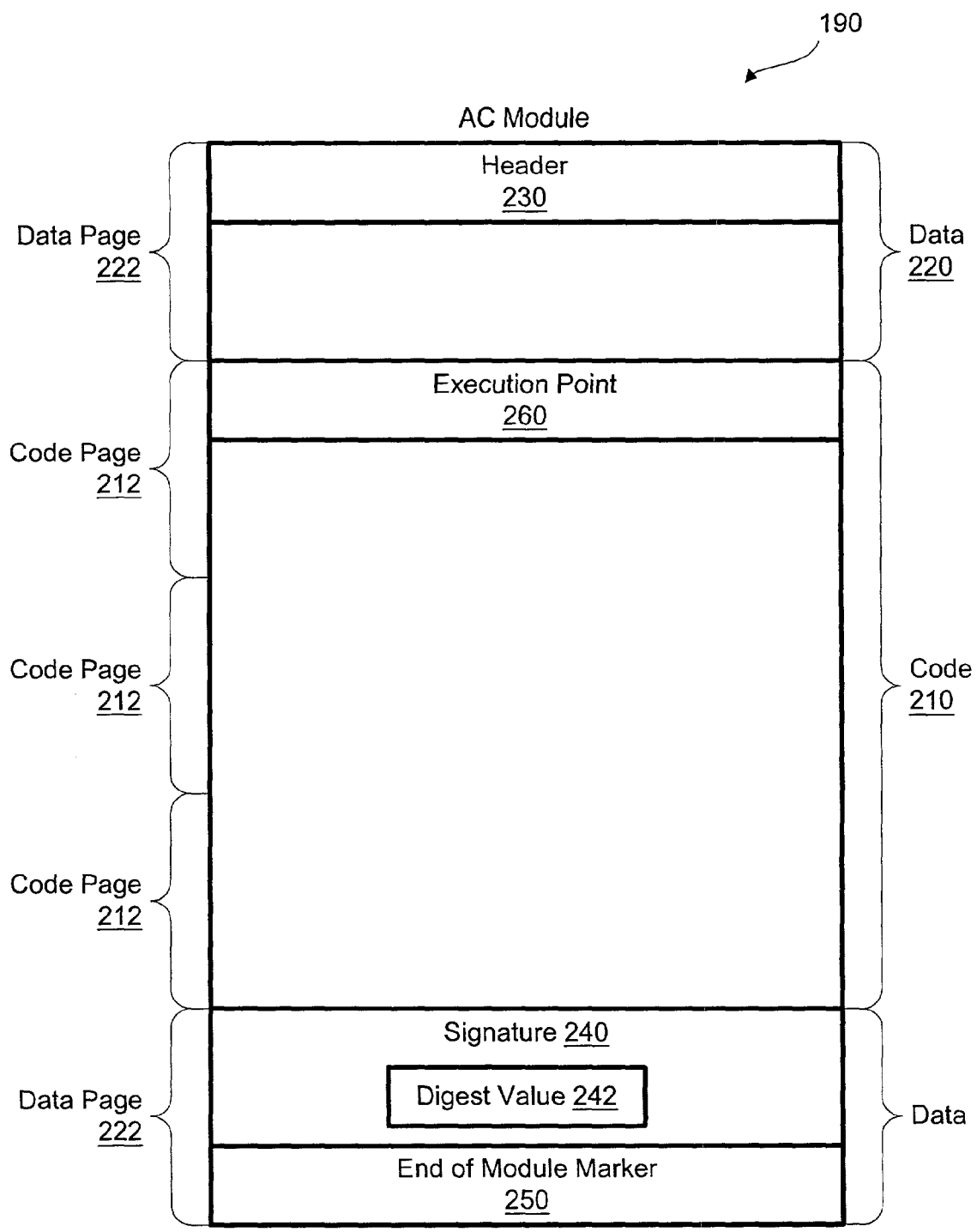
FIG. 2 illustrates an example authenticated code (AC) module that may launched by the computing device shown in FIGS. 1A-1E.

Referring now to FIG. 2, an example embodiment of the AC module 190 is shown in more detail. The AC module 190 may comprise code 210 and data 220. The code 210 comprises one or more code pages 212 and the data 220 comprises one or more data pages 222. Each code page 212 and data page 222 in an example embodiment corresponds to a 4 kilobyte contiguous memory region; however, the code 210 and data 220 may be implemented with different page sizes or in a non-paging manner. The code pages 212 comprise processor instructions to be executed by one or more processors 110 and the data pages 222 comprise data to be accessed by one or more processors 110 and/or scratch pad for storing data generated by one or more processors 110 in response to executing instructions of the code pages 212.

The AC module 190 may further comprise one or more headers 230 that may be part of the code 210 or the data 220. The headers 230 may provide information about the AC module 190 such as, for example, module author, copyright notice, module version, module execution point location, module length, authentication method, etc. The AC module 190 may further comprise a signature 240 which may be a part of the code 210, data 220, and/or headers 230. The signature 240 may provide information about the AC module 190, authentication entity, authentication message, authentication method, and/or digest value.

The AC module 190 may also comprise an end of module marker 250. The end of module marker 250 specifies the end of the AC module 190 and may be used as an alternative to specifying the length of the AC module 190. For example, the code pages 212 and data pages 222 may be specified in a contiguous manner and the end of module marker 250 may comprise a predefined bit pattern that signals the end of the code pages 212 and data pages 222. It should be appreciated that the AC module 190 may specify its length and/or end in a number of different manners. For example, the header 230 may specify the number of bytes or the number of pages the AC module 190 contains. Alternatively, launch AC and terminate AC instructions may expect the AC module 190 be a predefined number of bytes in length or contain a predefined number of pages. Further, launch AC and terminate AC instructions may comprise operands that specify the length of the AC module 190.

It should be appreciated that the AC module 190 may reside in a contiguous region of the memory 140 that is contiguous in the physical memory space or that is contiguous in virtual memory space. Whether physically or virtually contiguous, the locations of the memory 140 that store the AC module 190 may be specified by a starting location and a length and/or end of module marker 250 may specify. Alternatively, the AC module 190 may be stored in memory 140 in neither a physically or a virtually contiguous manner. For example, the AC module 190 may be stored in a data structure such as, for example, a linked list that permits the computing device 100 to store and retrieve the AC module 190 from the memory 140 in a non-contiguous manner.

As will be discussed in more detail below, the example processors 110 support launch AC instructions that load the AC module 190 into private memory 160 and initiate execution of the AC module 190 from an execution point 260. An AC module 190 to be launched by such a launch AC instruction may comprise code 210 which when loaded into the private memory 160 places the execution point 260 at a location specified one or more operands of a launch AC instruction. Alternatively, a launch AC instruction may result in the processor 110 obtaining the location of the execution point 260 from the AC module 190 itself. For example, the code 210, data 220, a header 230, and/or signature 240 may comprise one or more fields that specify the location of the execution point 260.

As will be discussed in more detail below, the example processors 110 support launch AC instructions that authenticated the AC module 190 prior to execution. Accordingly, the AC module 190 may comprise information to support authenticity determinations by the processors 110. For example, the signature 240 may comprise a digest value 242. The digest value 242 may be generated by passing the AC module 190 through a hashing algorithm (e.g. SHA-1 or MD5) or some other algorithm. The signature 240 may also be encrypted to prevent alteration of the digest value 242 via an encryption algorithm (e.g. DES, 3DES, AES, and/or RSA algorithms). In example embodiment, the signature 240 is RSA-encrypted with the private key that corresponds to a public key of the processor key 116, the chipset key 122, and/or platform key 152.

It should be appreciated that the AC module 190 may be authenticated via other mechanisms. For example, the AC module 190 may utilize different hashing algorithms or different encryption algorithms. Further, the AC module 190 may comprise information in the code 210, data 220, headers 230, and/or signature 240 that indicate which algorithms were used. The AC module 190 may also be protected by encrypting the whole AC module 190 for decryption via a symmetric or asymmetric key of the processor key 116, chipset key 124, or platform key 152.

Figure 3:
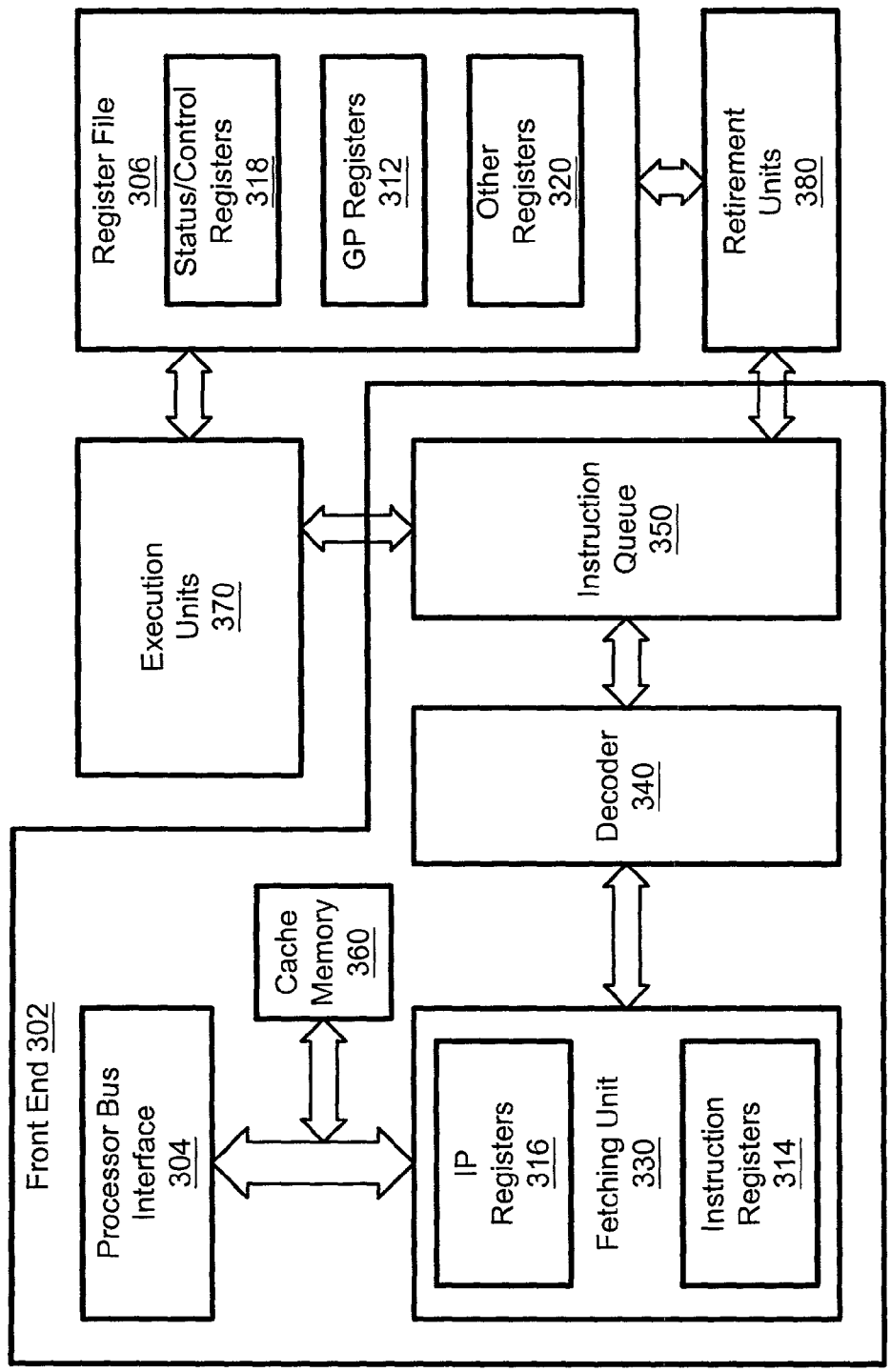
FIG. 3 illustrates an example embodiment of the processor of the computing device shown in FIGS. 1A-1E.

An example embodiment of the processor 110 is illustrated in more detail in FIG. 3. As depicted, the processor 110 may comprise a front end 302, a register file 306, one or more execution units 370, and a retirement unit or back end 380. The front end 302 comprises a processor bus interface 304, a fetching unit 330 having instruction and instruction pointer registers 314, 316, a decoder 340, an instruction queue 350, and one or more cache memories 360. The register file 306 comprises general purpose registers 312, status/control registers 318, and other registers 320. The fetching unit 330 fetches the instructions specified by the instruction pointer registers 316 from the memory 140 via the processor bus interface 304 or the cache memories 360 and stores the fetched instructions in the instruction registers 314.

An instruction register 314 may contain more than one instruction. According, the decoder 340 identifies the instructions in the instruction registers 314 and places the identified instructions in the instruction queue 350 in a form suitable for execution. For example, the decoder 340 may generate and store one or more micro-operations (uops) for each identified instruction in the instruction queue 350. Alternatively, the decoder 340 may generate and store a single macro-operation (Mop) for each identified instruction in the instruction queue 350. Unless indicated otherwise the term ops is used hereafter to refer to both uops and Mops.

The processor 110 further comprises one or more execution units 370 that perform the operations dictated by the ops of the instruction queue 350. For example, the execution units 370 may comprise hashing units, decryption units, and/or microcode units that implement authentication operations that may be used to authenticate the AC module 190. The execution units 370 may perform in-order execution of the ops stored in the instruction queue 350. However, in an example embodiment, the processor 110 supports out-of-order execution of ops by the execution units 370. In such an embodiment, the processor 110 may further comprise a retirement unit 380 that removes ops from the instruction queue 350 in-order and commits the results of executing the ops to one or more registers 312, 314, 316, 318, 320 to insure proper in-order results.

The decoder 340 may generate one or more ops for an identified launch AC instruction and the execution units 370 may load, authenticate, and/or initiate execution of an AC module 190 in response to executing the associated ops. Further, the decoder 340 may generate one or more ops for an identified terminate AC instruction and the execution units 370 may terminate execution of an AC module 190, adjust security aspects of the computing device 100, and/or initiate execution of post-AC code in response to executing the associated ops.

In particular, the decoder 340 may generate one or more ops that depend on the launch AC instruction and the zero or more operands associated with the launch AC instruction. Each launch AC instruction and its associated operands specify parameters for launching the AC module 190. For example, the launch AC instruction and/or operands may specify parameters about the AC module 190 such as AC module location, AC module length, and/or AC module execution point. The launch AC instruction and/or operands may also specify parameters about the private memory 160 such as, for example, private memory location, private memory length, and/or private memory implementation. The launch AC instruction and/or operands may further specify parameters for authenticating the AC module 190 such as specifying which authentication algorithms, hashing algorithms, decryption algorithms, and/or other algorithms are to be used. The launch AC instruction and/or operands may further specify parameters for the algorithms such as, for example, key length, key location, and/or keys. The launch AC instruction and/or operands may further specify parameters to configure the computer system 100 for AC module launch such as, for example, specifying events to be masked/unmasked and/or security capabilities to be updated.

The launch AC instructions and/or operands may provide fewer, additional, and/or different parameters than those described above. Furthermore, the launch AC instructions may comprise zero or more explicit operands and/or implicit operands. For example, the launch AC instruction may have operand values implicitly specified by processor registers and/or memory locations despite the launch AC instruction itself not comprising fields that define the location of these operands. Furthermore, the launch AC instruction may explicitly specify the operands via various techniques such as, for example, immediate data, register identification, absolute addresses, and/or relative addresses.

The decoder 340 may also generate one or more ops that depend on the terminate AC instructions and the zero or more operands associated with the terminate AC instructions. Each terminate AC instruction and its associated operands specify parameters for terminating execution of the AC module 190. For example, the terminate AC instruction and/or operands may specify parameters about the AC module 190 such as AC module location and/or AC module length. The terminate AC instruction and/or operands may also specify parameters about the private memory 160 such as, for example, private memory location, private memory length, and/or private implementation. The terminate AC instruction and/or operands may specify parameters about launching post-AC code such as, for example, launching method and/or post-AC code execution point. The terminate AC instruction and/or operands may further specify parameters to configure the computer system 100 for post-AC code execution such as, for example, specifying events to be masked/unmasked and/or security capabilities to be updated.

The terminate AC instructions and/or operands may provide fewer, additional, and/or different parameters than those described above. Furthermore, the terminate AC instructions may comprise zero or more explicit operands and/or implicit operands in a manner as described above in regard to the launch AC instructions.

Figure 4:
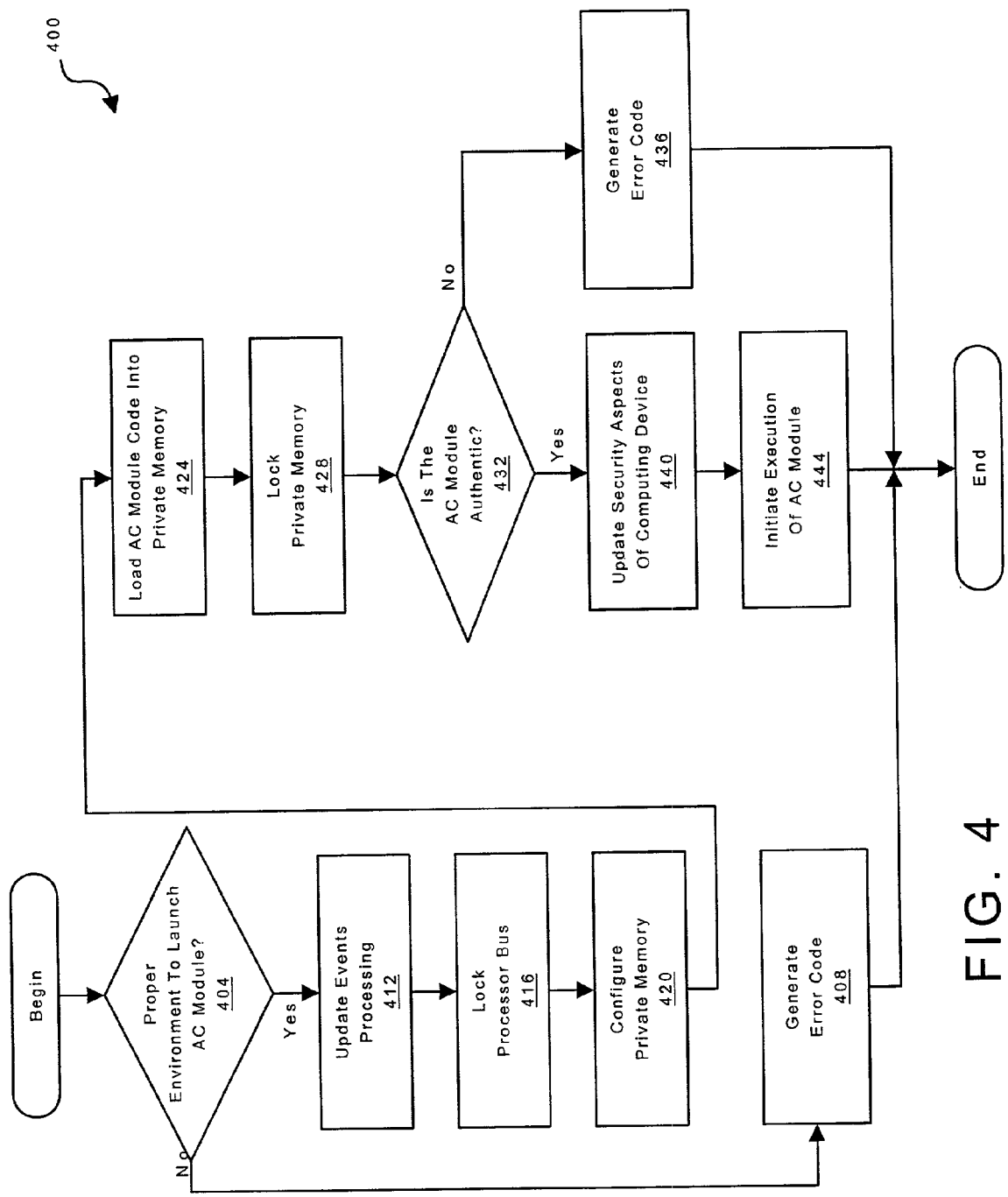
FIG. 4 illustrates an example method of launching the AC module shown in FIG. 2.

Referring now to FIG. 4, there is depicted a method 400 of launching an AC module 190. In particular, the method 400 illustrates the operations of a processor 110 in response to executing an example ENTERAC instruction having an authenticate operand, a module operand, and a length operand. However, one skilled in the art should be able implement other launch AC instructions having fewer, additional, and/or different operands without undue experimentation.

In block 404, the processor 110 determines whether the environment is appropriate to start execution of an AC module 190. For example, the processor 110 may verify that its current privilege level, operating mode, and/or addressing mode are appropriate. Further, if the processor supports multiple hardware threads, the processor may verify that all other threads have halted. The processor 110 may further verify that the chipset 120 meets certain requirements. In an example embodiment of the ENTERAC instruction, the processor 110 determines that the environment is appropriate in response to determining that the processor 110 is in a protected flat mode of operation, that the processor's current privilege level is 0, that the processor 110 has halted all other threads of execution, and that the chipset 120 provides trusted platform capabilities as indicated by one or more registers 126. Other embodiments of launch AC instructions may define appropriate environments differently. Other launch AC instructions and/or associated operands may specify environment requirements that result in the processor 110 verifying fewer, additional, and/or different parameters of its environment.

In response to determining that the environment is inappropriate for launching an AC module 190, the processor 110 may terminate the ENTERAC instruction with an appropriate error code (block 408). Alternatively, the processor 110 may further trap to some more trusted software layer to permit emulation of the ENTERAC instruction.

Otherwise, the processor 110 in block 412 may update event processing to support launching the AC module 190. In an example embodiment of the ENTERAC instruction, the processor 110 masks processing of the INTR, NMI, SMI, INIT, and A20M events. Other launch AC instructions and/or associated operands may specify masking fewer, additional, and/or different events. Further, other launch AC instructions and/or associated operands may explicitly specify the events to be masked and the events to be unmasked. Alternatively, other embodiments may avoid masking events by causing the computing device 100 to execute trusted code such as, for example, event handlers of the AC module 190 in response to such events.

The processor 110 in block 416 may lock the processor bus 130 to prevent the other processors 110 and the chipset 120 from acquiring ownership of the processor bus 130 during the launch and execution of the AC module 190. In an example embodiment of the ENTERAC instruction, the processor 110 obtains exclusive ownership of the processor bus 130 by generating a special transaction that provides the other processors 110 and the chipset 120 with a LT.PROCESSOR.HOLD bus message. Other embodiments of launch AC instructions and/or associated operands may specify that the processor bus 130 is to remain unlocked or may specify a different manner to lock the processor bus 130.

The processor 110 in block 420 may configure its private memory 160 for receiving the AC module 190. The processor 110 may clear the contents of the private memory 160 and may configure control structures associated with the private memory 160 to enable the processor 110 to access the private memory 160. In an example embodiment of the ENTERAC instruction, the processor 110 updates one or more control registers to switch the cache memory 112 to the cache-as-RAM mode and invalidates the contents of its cache memory 112.

Other launch AC instructions and/or associated operands may specify private memory parameters for different implementations of the private memory 160. (See, for example, FIGS. 1A-1E). Accordingly, the processor 110 in executing these other launch AC instructions may perform different operations in order to prepare the private memory 160 for the AC module 190. For example, the processor 110 may enable/configure a memory controller (e.g. PM controller 128 of FIG. 1E) associated with the private memory 160. The processor 110 may also provide the private memory 160 with a clear, reset, and/or invalidate signal to clear the private memory 160. Alternatively, the processor 110 may write zeros or some other bit pattern to the private memory 160, remove power from the private memory 160, and/or utilize some other mechanism to clear the private memory 160 as specified by the launch AC instruction and/or operands.

In block 424, the processor 110 loads the AC module 190 into its private memory 160. In an example embodiment of the ENTERAC instruction, the processor 110 starts reading from a location of the memory 140 specified by the address operand until a number of bytes specified by the length operand are transferred to its cache memory 112. Other embodiments of launch AC instructions and/or associated operands may specify parameters for loading the AC module 190 into the private memory 160 in a different manner. For example, the other launch AC instructions and/or associated operands may specify the location of the AC module 190, the location of the private memory 160, where the AC module 190 is to be loaded in the private memory 160, and/or the end of the AC module 190 in numerous different manners.

In block 428, the processor 110 may further lock the private memory 160. In an example embodiment of the ENTERAC instruction, the processor 110 updates one or more control registers to lock its cache memory 112 to prevent external events such as snoop requests from processors or I/O devices from altering the stored lines of the AC module 190. However, other launch AC instructions and/or associated operands may specify other operations for the processor 110. For example, the processor 110 may configure a memory controller (e.g. PM controller 128 of FIG. 1E) associated with the private memory 160 to prevent the other processors 110 and/or chipset 120 from accessing the private memory 160. In some embodiments, the private memory 160 may already be sufficiently locked, thus the processor 110 may take no action in block 428.

The processor in block 432 determines whether the AC module 190 stored in its private memory 160 is authentic based upon a protection mechanism specified by the protection operand of the ENTERAC instruction. In an example embodiment of the ENTERAC instruction, the processor 110 retrieves a processor key 116, chipset key 124, and/or platform key 152 specified by the protection operand. The processor 110 then RSA-decrypts the signature 240 of the AC module 190 using the retrieved key to obtain the digest value 242. The processor 110 further hashes the AC module 190 using a SHA-1 hash to obtain a computed digest value. The processor 110 then determines that the AC module 190 is authentic in response to the computed digest value and the digest value 242 having an expected relationship (e.g. equal to one another). Otherwise, the processor 110 determines that the AC module 190 is not authenticate.

Other launch AC instructions and/or associated operands may specify different authentication parameters. For example, the other launch AC instructions and/or associated operands may specify a different authentication method, different decryption algorithms, and/or different hashing algorithms. The other launch AC instructions and/or associated operands may further specify different key lengths, different key locations, and/or keys for authenticating the AC module 190.

In response to determining that the AC module 190 is not authentic, the processor 110 in block 436 generates an error code and terminates execution of the launch AC instruction. Otherwise, the processor 110 in block 440 may update security aspects of the computing device 100 to support execution of the AC module 190. In an example embodiment of the ENTERAC instruction, the processor 110 in block 440 writes a OpenPrivate command to a command register 126 of the chipset 120 to enable the processor 110 to access registers 126 via the private space 142 with normal unprivileged read and write transactions.

Other launch AC instructions and/or associated operands may specify other operations to configure the computing device 100 for AC module execution. For example, a launch AC instruction and/or associated operands may specify that the processor 110 leave the private space 142 in its current state. A launch AC instruction and/or associated operands may also specify that the processor 110 enable and/or disable access to certain computing resources such as protected memory regions, protected storage devices, protected partitions of storage devices, protected files of storage devices, etc.

After updating security aspects of the computing device 100, the processor 110 in block 444 may initiate execution of the AC module 190. In an example embodiment of the ENTERAC instruction, the processor 110 loads its instruction pointer register 316 with the physical address provided by the module operand resulting in the processor 110 jumping to and executing the AC module 190 from the execution point 260 specified by the physical address. Other launch AC instructions and/or associated operands may specify the location of the execution point 260 in a number of alternative manners. For example, a launch AC instruction and/or associated operands may result in the processor 110 obtaining the location of the execution point 260 from the AC module 190 itself.

Figure 5:
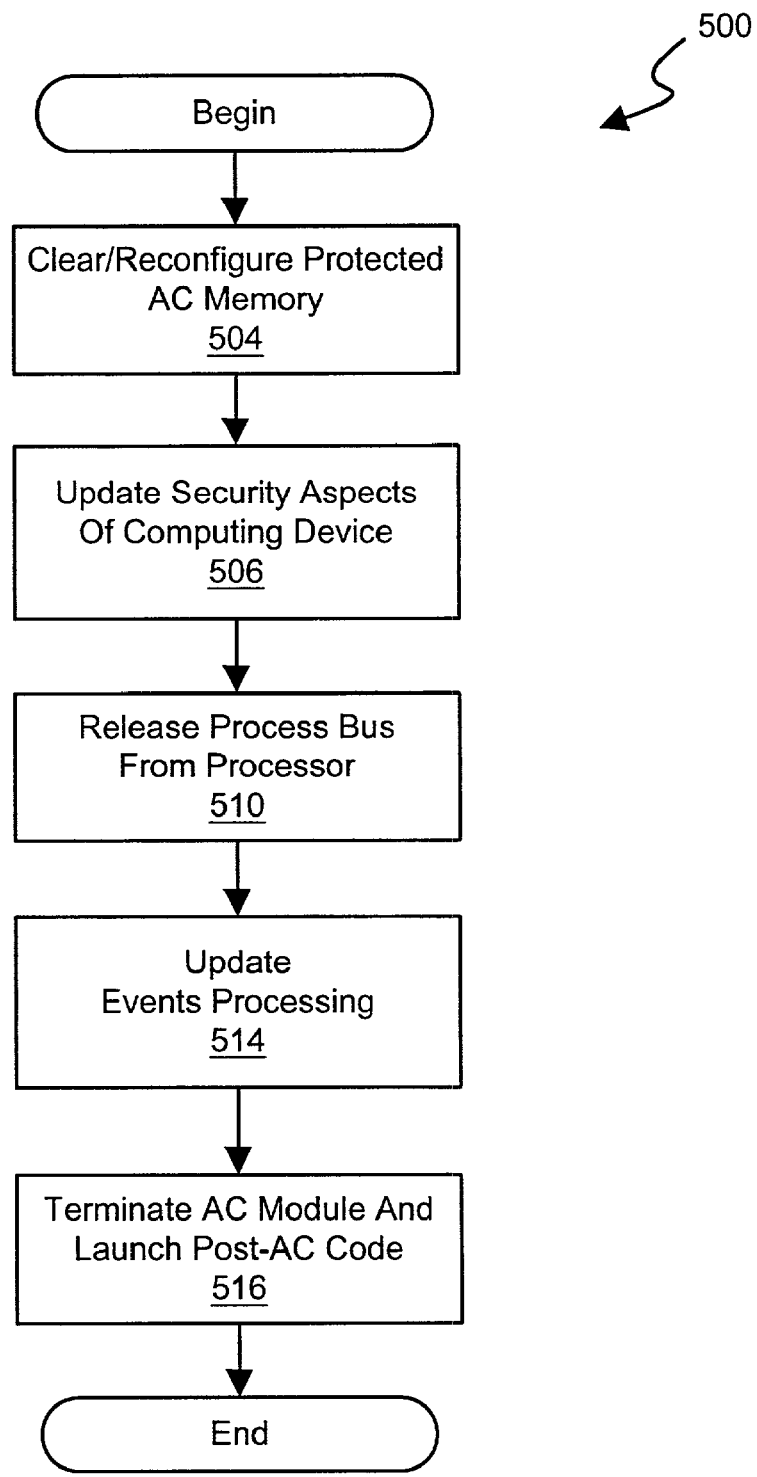
FIG. 5 illustrates an example method of terminating execution of the AC module shown in FIG. 2.

Referring now to FIG. 5, there is depicted a method 500 of terminating an AC module 190. In particular, the method 500 illustrates the operations of a processor 110 in response to executing an example EXITAC instruction having a protection operand, an events operand, and a launch operand. However, one skilled in the art should be able to implement other terminate AC instructions having fewer, additional, and/or different operands without undue experimentation.

In block 504, the processor 110 may clear and/or reconfigure the private memory 160 to prevent further access to the AC module 190 stored in the private memory 160. In an example embodiment of the EXITAC instruction, the processor 110 invalidates its cache memory 112 and updates control registers to switch the cache memory 112 to the normal cache mode of operation.

A terminate AC instruction and/or associated operand may specify private memory parameters for different implementations of the private memory 160. (See, for example, FIGS. 1A-1E). Accordingly, a terminate AC instruction and/or associated operand may result in the processor 110 performing different operations in order to prepare the computing device 100 for post-AC code execution. For example, the processor 110 may disable a memory controller (e.g. PM controller 128 of FIG. 1E) associated with the private memory 160 to prevent further access to the AC module 190. The processor 110 may also provide the private memory 160 with a clear, reset, and/or invalidate signal to clear the private memory 160. Alternatively, the processor 110 may write zeros or some other bit pattern to the private memory 160, remove power from the private memory 160, and/or utilize some other mechanism to clear the private memory 160 as specified by a terminate AC instruction and/or associated operands.

The processor 110 in block 506 may update security aspects of the computing device 100 based upon the protection operand to support post-AC code execution. In an example embodiment of the EXITAC instruction, the protection operand specifies whether the processor 110 is to close the private space 142 or leave the private space 142 in its current state. In response to determining to leave the private space 142 in its current state, the processor 110 proceeds to block 510. Otherwise, the processor 110 closes the private space 142 by writing a ClosePrivate command to a command register 126 to prevent the processors 110 from further accessing the registers 126 via normal unprivileged read and write transactions to the private space 142.

A terminate AC instruction and/or associated operands of another embodiment may result in the processor 110 updating other security aspects of the computing device 100 to support execution of code after the AC module 190. For example, a terminate AC instruction and/or associated operands may specify that the processor 110 enable and/or disable access to certain computing resources such as protected memory regions, protected storage devices, protected partitions of storage devices, protected files of storage devices, etc.

The processor 110 in block 510 may unlock the processor bus 130 to enable other processors 110 and the chipset 120 to acquire ownership of the processor bus 130. In an example embodiment of the EXITAC instruction, the processor 110 releases exclusive ownership of the processor bus 130 by generating a special transaction that provides the other processors 110 and the chipset 120 with a LT.PROCESSOR.RELEASE bus message. Other embodiments of terminate AC instructions and/or associated operands may specify that the processor bus 130 is to remain locked or may specify a different manner to unlock the processor bus 130.

The processor 110 in block 514 may update events processing based upon the mask operand. In example embodiment of the EXITAC instruction, the mask operand specifies whether the processor 110 is to enable events processing or leave events processing in its current state. In response to determining to leave events processing in its current state, the processor 110 proceeds to block 516. Otherwise, the processor 110 unmasks the INTR, NMI, SMI, INIT, and A20M events to enable processing of such events. Other terminate AC instructions and/or associated operands may specify unmasking fewer, additional, and/or different events. Further, other terminate AC instructions and/or associated operands may explicitly specify the events to be masked and the events to be unmasked.

The processor 110 in block 516 terminates execution of the AC module 190 and launches post-AC code specified by the launch operand. In an example embodiment of the EXITAC instruction, the processor 110 updates its code segment register and instruction pointer register with a code segment and segment offset specified by the launch operand. As a result, the processor 110 jumps to and begins executing from an execution point of the post-AC code specified by the code segment and segment offset.

Other terminate AC modules and/or associated operands may specify the execution point of the post-AC code in a number of different manners. For example, a launch AC instruction may result in the processor 110 saving the current instruction pointer to identify the execution point of post-AC code. In such an embodiment, the terminate AC instruction may retrieve the execution point saved by the launch AC instruction and initiate execution of the post-AC code from the retrieved execution point. In this manner, the terminate AC instruction returns execution to the instruction following the launch AC instruction. Further, in such an embodiment, the AC module 190 appears to have been called, like a function call or system call, by the invoking code.

Another embodiment of the computing device 100 is shown in FIG. 6. The computing device 100 comprises processors 110, a memory interface 620 that provides the processors 110 access to a memory space 640, and a media interface 170 that provides the processors 110 access to media 180. The memory space 640 comprises an address space that may span multiple machine readable media from which the processor 110 may execute code such as, for example, firmware, system memory 140, private memory 160, hard disk storage, network storage, etc (See, FIGS. 1A-1E). The memory space 640 comprises pre-AC code 642, an AC module 190, and post-AC code 646. The pre-AC code 642 may comprise operating system code, system library code, shared library code, application code, firmware routines, BIOS routines, and/or other routines that may launch execution of an AC module 190. The post-AC code 646 may similarly comprise operating system code, system library code, shared library code, application code, firmware routines, BIOS routines, and/or other routines that may be executed after the AC module 190. It should be appreciated that the pre-AC code 642 and the post-AC code 646 may be the same software and/or firmware module or different software and/or firmware modules.

Figure 7A:
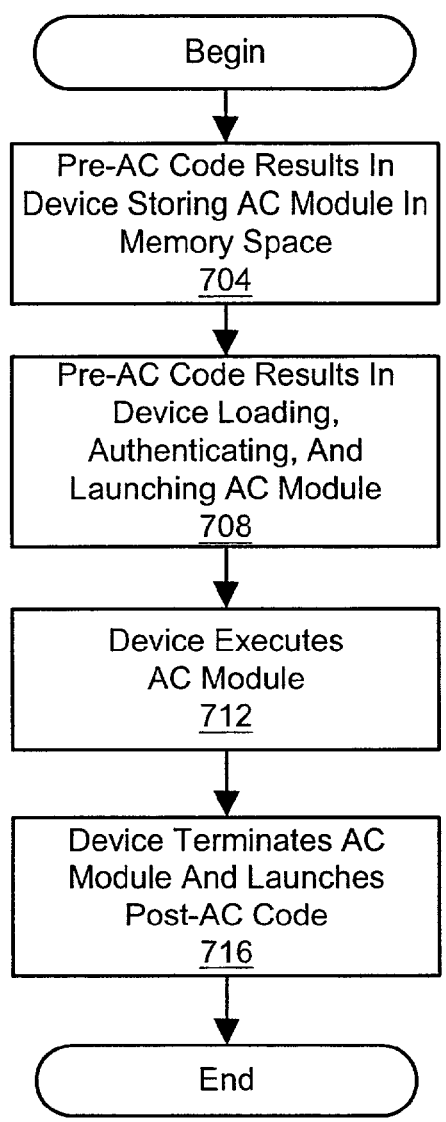
FIGS. 7A-7B illustrate example methods of launching and terminating execution of the AC module shown in FIG. 2.

An example embodiment of launching and terminating an AC module is illustrated in FIG. 7A. In block 704, the computing device 100 stores the AC module 190 into the memory space 640 in response to executing the pre-AC code 642. In an example embodiment, the computing device 100 retrieves the AC module 190 from a machine readable medium 180 via the media interface 170 and stores the AC module 190 in the memory space 640. For example, the computing device 100 may retrieve the AC module 190 from firmware, a hard drive, system memory, network storage, a file server, a web server, etc and may store the retrieved AC module 190 into a system memory 140 of the computing device 100.

The computing device 100 in block 708 loads, authenticates, and initiates execution of the AC module 190 in response to executing the pre-AC code 642. For example, the pre-AC code 642 may comprise an ENTERAC instruction or another launch AC instruction that results in the computing device 100 transferring the AC module 190 to private memory 160 of the memory space 640, authenticating the AC module 190, and invoking execution of the AC module 190 from its execution point. Alternatively, the pre-AC code 642 may comprise a series of instructions that result in the computing device 100 transferring the AC module 190 to private memory 160 of the memory space 640, authenticating the AC module 190, and invoking execution of the AC module 190 from its execution point.

In block 712, the computing device 100 executes the code 210 of the AC module 190 (See, FIG. 2). The computing device 100 in block 716 terminates execution of the AC module 190 and initiates execution of the post-AC code 646 of the memory space 640. For example, the AC module 190 may comprise an EXITAC instruction or another terminate AC instruction that results in the computing device 100 terminating execution of the AC module 190, updating security aspects of the computing device 100, and initiating execution of the post-AC code 646 from an execution point of the post-AC code 646. Alternatively, the AC module 190 may comprise a series of instructions that result in the computing device 100 terminating execution of the AC module 190 and initiating execution of the post-AC code 646 from an execution point of the post-AC code 646.

Figure 7B:
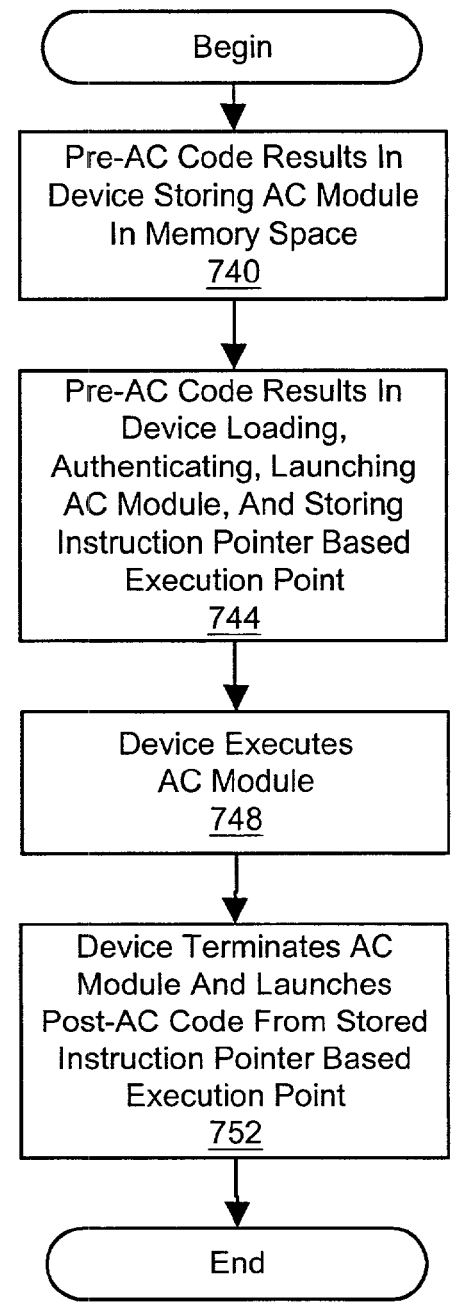

Another example embodiment of launching and terminating an AC module is illustrated in FIG. 7B. In block 740, the computing device 100 stores the AC module 190 into the memory space 640 in response to executing the pre-AC code 642. In an example embodiment, the computing device 100 retrieves the AC module 190 from a machine readable medium 180 via the media interface 170 and stores the AC module 190 in the memory space 640. For example, the computing device 100 may retrieve the AC module 190 from firmware, a hard drive, system memory, network storage, a file server, a web server, etc and stores the retrieved AC module 190 into a system memory 140 of the computing device 100.

The computing device 100 in block 744 loads, authenticates, and initiates execution of the AC module 190 response to executing the pre-AC code 642. The computing device in block 744 further saves an execution point for the post-AC code 646 that is based upon the instruction pointer. For example, the pre-AC code 642 may comprise an ENTERAC instruction or another launch AC instruction that results in the computing device 100 transferring the AC module 190 to private memory 160 of the memory space 640, authenticating the AC module 190, invoking execution of the AC module 190 from its execution point, and saving the instruction pointer so that the processor 110 may return to the instruction following the launch AC instruction after executing the AC module 190. Alternatively, the pre-AC code 642 may comprise a series of instructions that result in the computing device 100 transferring the AC module 190 to private memory 160 of the memory space 640, authenticating the AC module 190, invoking execution of the AC module 190 from its execution point, and saving the instruction pointer.

In block 748, the computing device 100 executes the code 210 of the AC module 190 (See, FIG. 2). The computing device 100 in block 752 terminates execution of the AC module 190, loads the instruction pointer based execution point saved in block 744, and initiates execution of the instruction following the launch AC instruction or the series of instructions executed in block 744. For example, the AC module 190 may comprise an EXITAC instruction or another terminate AC instruction that results in the computing device 100 terminating execution of the AC module 190, updating security aspects of the computing device 100, and initiating execution of the post-AC code 646 from an execution point of the post-AC code 646 specified by the instruction pointer saved in block 744. Alternatively, the AC module 190 may comprise a series of instructions that result in the computing device 100 terminating execution of the AC module 190, updating security aspects of the computing device 100, and initiating execution of the post-AC code 646 from an execution point of the post-AC code 646 specified by the instruction pointer saved in block 744.

Figure 8:
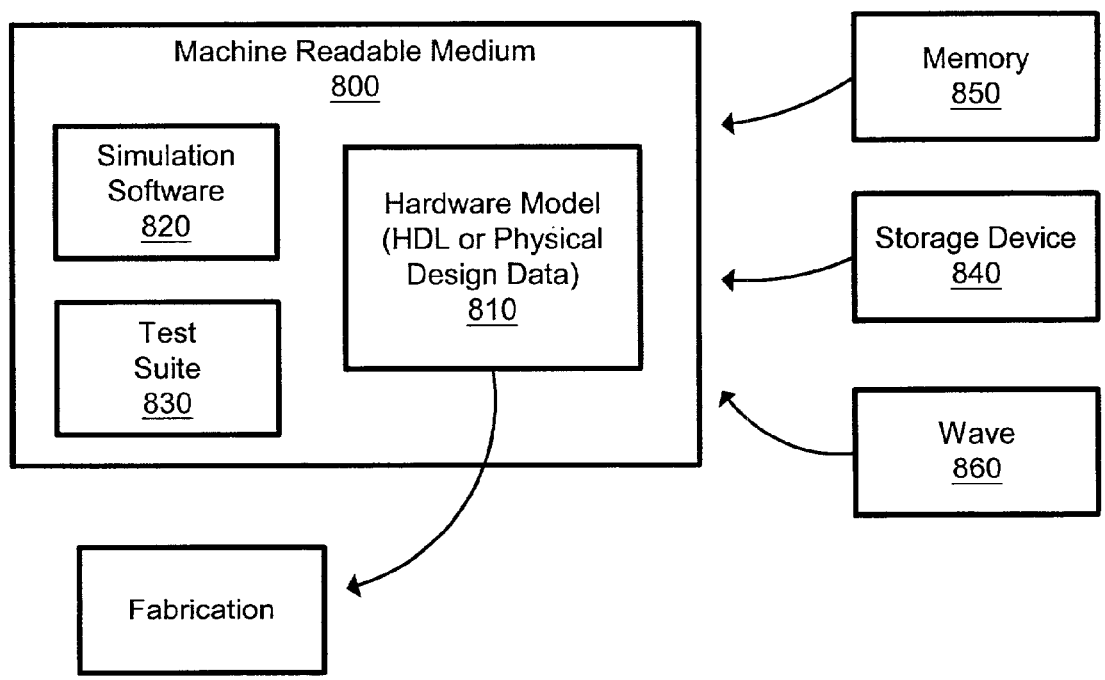
FIG. 8 illustrates a system for simulating, emulating, and/or testing the processors of the computing devices shown in FIGS. 1A-1E.

FIG. 8 illustrates various design representations or formats for simulation, emulation, and fabrication of a design using the disclosed techniques. Data representing a design may represent the design in a number of manners. First, as is useful in simulations, the hardware may be represented using a hardware description language or another functional description language which essentially provides a computerized model of how the designed hardware is expected to perform. The hardware model 810 may be stored in a storage medium 800 such as a computer memory so that the model may be simulated using simulation software 820 that applies a particular test suite 830 to the hardware model 810 to determine if it indeed functions as intended. In some embodiments, the simulation software is not recorded, captured, or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, re-configurable hardware is another embodiment that may involve a machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a computer readable medium. A memory 850, or a magnetic or optical storage 840 such as a disc may be the medium. The set of bits describing the design or the particular part of the design are an article that may be sold in and of itself or used by others for further design or fabrication.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method for authenticating code modules on a computing device comprising:
   receiving a code module into the computing device via a media interface;
   loading the code module into a private memory of the computing device;
   accessing a key embedded in the computing device in one of a processor, a chipset or a physical token; and
   authenticating the code module in the private memory using the embedded key.

2. The method of claim 1, further comprising:
   locking the private memory.

3. The method of claim 1, wherein authenticating the code module using the embedded key further comprises:
   extracting a signature from the code module;
   hashing a portion of the code module to obtain a computed digest value;
   decrypting the signature using the embedded key to obtain a decrypted digest value;
   determining whether the code module is authentic, wherein determining includes comparing the computed digest value to the decrypted digest value.

4. The method of claim 1, further comprising:
   updating security aspects of the computing device, if the code module is authentic; and
   initiating execution of the code module, only if the code module is authentic.

5. The method of claim 1, further comprising before loading the code module:
   verifying the computing device possesses a proper environment;
   locking a processor bus;
   configuring the private memory; and
   updating events processing.

6. The method of claim 1, further comprising after the code module has executed:
   reconfiguring the private memory;
   updating security aspects of the computing device;
   releasing the processor bus;
   updating events processing;
   terminating the code module; and
   launching post code module code.

7. An article of manufacture comprising a computer-readable medium having content stored thereon to provide instructions to result in a computing device performing operations including:
   receiving a code module into the computing device via a media interface;
   loading the code module into a private memory of the computing device;
   accessing a key embedded in the computing device in one of a processor, a chipset or a physical token; and
   authenticating the code module in the private memory using the embedded key.

8. The article of manufacture of claim 7, further having content to provide instructions to result in the electronic device performing additional operations including:
   locking the private memory.

9. The article of manufacture of claim 7, wherein the instructions that when executed by a computing device cause the device to perform the operation of authenticating the code module using the embedded key further cause the device to perform additional operations including:
   extracting a signature from the code module;
   hashing a portion of the code module to obtain a computed digest value;
   decrypting the signature using the embedded key to obtain a decrypted digest value;
   determining whether the code module is authentic, wherein determining includes comparing the computed digest value to the decrypted digest value.

10. The article of manufacture of claim 7, further having content to provide instructions to result in the electronic device performing additional operations including:
    updating security aspects of the computing device, if the code module is authentic; and
    initiating execution of the code module, only if the code module is authentic.

11. The article of manufacture of claim 10, further having content to provide instructions to result in the electronic device performing additional operations before loading the code module including:

verifying the computing device possess a proper environment;
locking a processor bus;
configuring the private memory; and
updating events processing.

12. The article of manufacture of claim 11, further having content to provide instructions to result in the electronic device performing additional operations after loading the code module including:
reconfiguring the private memory;
updating security aspects of the computing device;
releasing the processor bus;
updating events processing;
terminating the code module; and
launching post code module code.

13. An apparatus comprising:
a private memory; and
a processor coupled with the private memory to load a code module into the private memory and to authenticate the code module using a key embedded in one of the processor, a chipset and a physical token.

14. The apparatus of claim 13, further comprising:
a media interface coupled with the processor to receive the code module and send the code module to the processor.

15. The apparatus of claim 13, wherein the private memory is part of the processor.

16. The apparatus of claim 13, wherein the private memory is part of a cache memory that is part of the processor.

17. The apparatus of claim 13, wherein the private memory is coupled to the processor via a dedicated data bus.

18. The apparatus of claim 13, wherein the private memory is part of a main memory coupled to the process via a memory controller.

19. The apparatus of claim 13, wherein the private memory is separate from the processor and coupled to the processor via a private memory controller that does not control a main memory.

20. The apparatus of claim 13, wherein the private memory to clear before the code module is loaded, to lock after the code module is loaded, to clear after the code module has executed.

* * * * *